March 5, 1935.  H. I. BERCHMAN  1,993,356
COOKING UTENSIL
Filed Aug. 9, 1932

INVENTOR:
Henri I. Berchman,
BY
Chas. McC. Chapman,
ATTORNEY.

Patented Mar. 5, 1935

1,993,356

UNITED STATES PATENT OFFICE 1,993,356

COOKING UTENSIL

Henri I. Berchman, New York, N. Y.

Application August 9, 1932, Serial No. 628,020

3 Claims. (Cl. 53—5)

This invention has reference to the art of cooking utensils and particularly relates to a broiler which may be used and then thrown away.

Among the objects of my invention may be noted the following: to provide a simple, economical, and effective device, capable of being produced very cheaply, for broiling meats, fish and game, and for other purposes found convenient and possible; to provide a device of the character above noted which, after being used, can be thrown away; to provide a device of the nature noted composed of material which is flame-resistant and fireproof and which is inodorous and will not impart to the foods cooked thereon either taste or odor; to provide a device of the character noted composed of two simple parts, one of which is adapted to catch and hold the grease or drippings resulting from broiling or roasting and the other of which supports the food, and which is so cheap and simple in form as to enable it to be thrown away after being used or contaminated; and to provide a simple and economical broiler which will be of such structure and capable of such use as to act as a protecting medium for the usual drip-pan or as a substitute for the latter and the usual grid, forming part of the equipment of gas and electric stoves, and which are utilized for broiling and roasting purposes.

With the above objects in view and others which will be noted during the course of this description, my invention consists in the parts, features, elements and combinations thereof hereinafter described and claimed.

Figure 1:
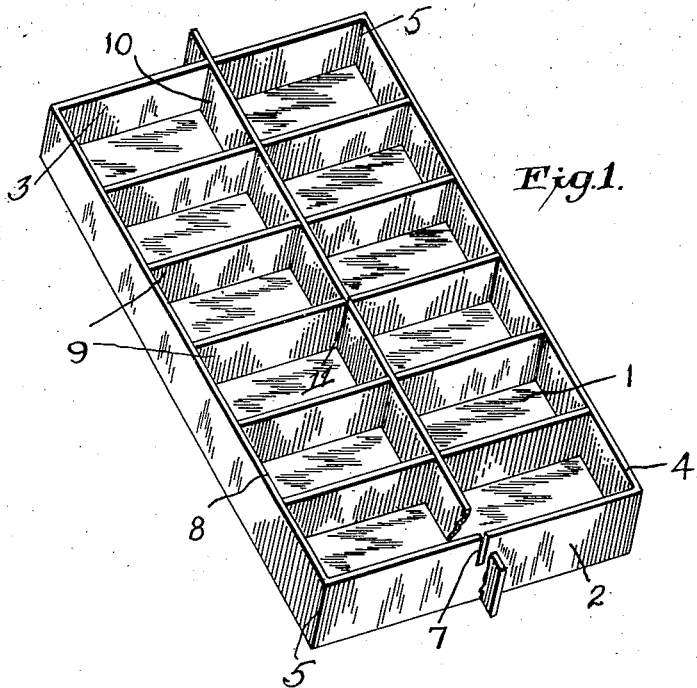
Figure 2:
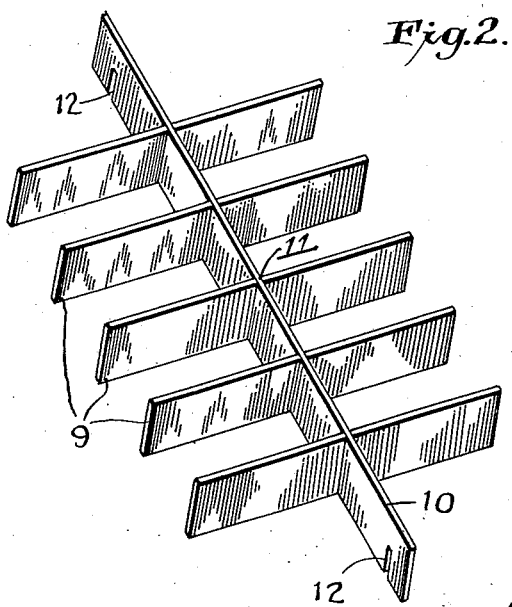

In order that my invention may be clearly understood, I have provided drawing wherein:

Figure 1 is a perspective view of a form of my invention showing the drip pan and grid combined, parts being broken away in order to show how the grid bars interlock with each other and with the end members of the pan; and Figure 2 is a perspective view of the grid, the parts being so related as to show how they may be interlocked with each other as well as removed from each other or folded against each other.

Primarily, it should be understood that it is an important feature of my invention to provide a means and details of construction by which the necessary operations of broiling meat, fish and game and cooking other foodstuffs, as may be desired, can be accomplished without using either the grid of the stove or the drip-pan thereof, and for the purpose of protecting the latter, if it is desired to leave the pan in place, thus avoiding soiling the said stove parts by drippings or splashing or compelling the grid and drip-pan and oven to be washed or cleansed. It is, probably, one of the most disagreeable things for a housewife to be compelled to wash and scour the metal grids and enameled drip-pans of the modern gas and electric stoves; and it is an important part of my invention to avoid this disagreeable task or duty, and provide the housewife with an instrument made up of parts which are simple, economical to manufacture, and so cheaply obtained as to enable the instruments and parts thereof to be thrown away after use. Furthermore, the use of my invention prevents the grease accumulation in the sink and wash-pans and stoppage of drains, thus saving labor, expense and time.

In carrying out my invention, as shown in the drawing, I have provided a rectangular shallow dish or pan 1 which is composed of noninflammable material, such as asbestos, stiff paper chemically treated to make it noninflammable, or any other light material which in itself may be noninflammable, or treated to make it so, and which may be found suitable for and adaptable to the purposes of my invention. The pan 1 should be made of such size as to enable it to set freely and easily in the usual enameled drip-pan, of the stove, or in the oven after removing the enameled pan of the stove, so as to fully protect the same from being soiled by the drippings or splash from the food being cooked; and this pan should also be made sufficiently rigid or stiff as to prevent it from buckling or flexing as the result of the greaseweight after cooking and so as to enable it to be readily lifted and removed from the stove and thrown away. The pan 1 is provided with upturned end flanges 2 and 3 and integral side flanges 4 and 8. The end flanges are provided, for example, with transverse slots 7 for cooperation with slots 12 in the grid strip 10, thus forming an interlocking joint as presently described.

The grid is composed of a plurality of strips of flat material 9, held in parallel relation by the longitudinal tie-strip 10. Each of the strips 9 and 10 is provided with cooperating slots enabling them to be interlocked and held, as shown at 11 in Figures 1 and 2, and shifted laterally relatively, so as to be folded against, or flattened against, each other, or collapsed, for the purpose of packing, storage or transportation, as the case may be. Preferably, the longitudinal or lengthwise strip 10 is made sufficiently long to extend beyond the end flanges 2, 3 of the pan 1, and the extensions are provided with slots 12 for the purpose of enabling the strip 10 to be depressed upon and interlocked with the end flanges 2, 3 of the pan, as shown in Figure 1. Thus the collapsible grid can be properly opened and snugly set within the pan so that the longitudinal strip 10 and the cross-strips 9 may be engaged with the respective flanges of the pan, and with each other, so as to hold the grid in extended condition and rigidly within the pan. Thus set, the grid will sustain an unusual weight, greatly in excess of the weight of any food which may be placed upon it. The pan and grid are composed of non-inflammable, grease-proof and rigid material to prevent them from bending, singeing or burning while in use.

Of course, when the material of this device is formed and set, the corners will be turned, in any convenient manner, so as to provide a closure or seal as at 5, and to avoid bulk and unsightly appearance. It will be understood that this rectangular hollow device can be readily handled, after use, without fear of the grease drippings or contents thereof being spilled; and it will also be understood that when the device is in use, it will be impossible for the drippings to splash out of the inclosure and that the regular enameled drip-pan, if allowed to remain in the oven of the stove, cannot be soiled.

From the foregoing it will be understood that I have provided a household article combining a drip-pan and grid which can be very economically produced and which can be placed upon the market at such a low price as to justify the same being thrown away. Also, that I have provided a cooking utensil on which broiling and roasting can be done without soiling the enameled drip-pan of the stove, and without using the usual grid forming a part of the equipment of the stove. My structure is such that the grid-bars can be placed or folded within the vessel and different sizes of vessels can be nested together with a plurality of grids or bars placed therein for packing, transportation, storage and display.

I desire to lay stress upon the features of my invention pertaining to the material and its characteristics. That is to say, important features of my invention are that the material is flexible; sufficiently strong for all purposes; noninflammable, naturally or treated to be so; is fibrous, and may be more or less absorbent, and wholly odorless.

Having thus described my invention, what I claim and desire to secure by Letters Patent is:

1. A broiling utensil to be thrown away or discarded after a single use thereof comprising a hollow vessel, composed of a flexible sheet of fibrous, non-inflammable, grease impervious material, in combination with a removable grid of the same material located therein.

2. A broiling utensil comprising a rectangular, hollow, fibrous vessel open at its top, and a grid structure of the same material snugly set within the vessel and braced against its end and side flanges, the end bracing including locking means, said vessel and grid being also composed of non-inflammable material.

3. A broiling utensil comprising a rectangular, hollow, fibrous vessel open at its top, and a grid structure of the same material snugly set within the vessel and braced against its end and side flanges, said grid structure comprising a longitudinal strip provided with slots to engage the ends of the pan to lock the grid in position, said vessel and grid being also composed of noninflammable material.

HENRI I. BERCHMAN.